US012272074B1

(12) United States Patent
Wang et al.

(10) Patent No.: US 12,272,074 B1
(45) Date of Patent: Apr. 8, 2025

(54) METHOD AND SYSTEM FOR CONVERTING TRAJECTORY COORDINATES OF MOVING OBJECTS

(71) Applicant: SHANDONG UNIVERSITY, Jinan (CN)

(72) Inventors: Xu Wang, Jinan (CN); Fei Ma, Jinan (CN); Rongjian Dai, Jinan (CN); Tong Zhou, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/939,635

(22) Filed: Nov. 7, 2024

(30) Foreign Application Priority Data

Jul. 2, 2024 (CN) .......................... 202410873721.7

(51) Int. Cl.
*G06K 9/00* (2022.01)
*G06T 7/20* (2017.01)
*G06T 7/70* (2017.01)

(52) U.S. Cl.
CPC ............. *G06T 7/20* (2013.01); *G06T 7/70* (2017.01); *G06T 2207/10016* (2013.01); *G06T 2207/10032* (2013.01); *G06T 2207/20084* (2013.01); *G06T 2207/30241* (2013.01)

(58) Field of Classification Search
CPC . G06T 2207/30241; G06T 2207/10016; G06T 7/246; G06T 7/292
See application file for complete search history.

(56) References Cited

U.S. PATENT DOCUMENTS

| 2011/0169946 A1* | 7/2011 | Rudin | ..................... G06T 17/05 348/135 |
| 2016/0071276 A1* | 3/2016 | Rudin | ..................... G01S 5/16 382/103 |
| 2016/0093225 A1* | 3/2016 | Williams | ............ G08G 5/0056 701/17 |

(Continued)

FOREIGN PATENT DOCUMENTS

| CN | 113269098 A | 8/2021 |
| CN | 115439531 A | 12/2022 |

(Continued)

*Primary Examiner* — Hadi Akhavannik
(74) *Attorney, Agent, or Firm* — IPRO, PLLC

(57) ABSTRACT

Provided is a method and system for converting trajectory coordinates of moving objects, including: capturing a video of moving objects by drone; extracting trajectory data of moving objects in pixel coordinate system; solving a representation of unit direction vector corresponding to target point in camera coordinate system in ECEF coordinate system based on location information of drone, attitude information of camera, and intrinsic parameter information of camera during capturing of each frame, and in combination with pixel coordinates of target point in pixel coordinate system, to obtain a representation of vector from ECEF origin to the target point; and, representing coordinates of target point in WGS84 coordinate system by using the representation of vector from the ECEF origin to the target point, and finally obtaining the coordinates of target point in WGS84 coordinate system based on target point altitude is the same as altitude at which the drone takes off.

8 Claims, 1 Drawing Sheet

(56) References Cited

U.S. PATENT DOCUMENTS

2019/0147647 A1* 5/2019 Rudin ..................... G01S 19/51
                                                    348/135
2020/0279434 A1* 9/2020 Rudin ....................... G06T 7/74
2022/0207824 A1* 6/2022 Rudin ....................... H04N 7/18

FOREIGN PATENT DOCUMENTS

| CN | 115790582 A | 3/2023 |
| CN | 116045921 A | 5/2023 |
| CN | 116524159 A | 8/2023 |
| CN | 117649425 A | 3/2024 |

* cited by examiner

METHOD AND SYSTEM FOR CONVERTING TRAJECTORY COORDINATES OF MOVING OBJECTS

TECHNICAL FIELD

The present invention pertains to the field of machine vision technologies, and in particular, relates to a method and a system for converting trajectory coordinates of moving objects.

BACKGROUND OF THE INVENTION

In recent years, loop detectors, microwave detectors, and traffic surveillance cameras have been widely used to monitor traffic conditions. Development of information collection technologies and computer vision technologies enables researchers to extract high-precision vehicle trajectory data from traffic videos. However, camera calibration and coordinate conversion are a very complex process, especially for cameras mounted at fixed locations. In most of previous studies, an equation of a transformation relationship between an image point coordinate system and an object coordinate system is mainly established by using a direct linear transformation (DLT) theory in a close-range photogrammetry technology, to calculate real trajectory data of a vehicle. However, in camera calibration methods such as the DLT, control points and experimental fields need to be used for calibration, and these methods are usually affected by the number and distribution of control points on road sections, road slopes, and other factors. Therefore, measurement accuracy and application conditions of these methods are greatly limited.

SUMMARY OF THE INVENTION

To overcome the foregoing disadvantages in the conventional technology, the present invention provides a method and a system for converting trajectory coordinates of a moving object. Coordinates can be converted without the need for calibration using control points. The present invention may be applied to video data processing of a camera in an urban road network in which it is difficult to implement camera calibration.

To achieve the foregoing objective, one or more embodiments of the present invention provide the following technical solutions.

A first aspect of the present invention provides a method for converting trajectory coordinates of a moving object.

The method for converting trajectory coordinates of moving objects, including:
  capturing a video of a moving object by a drone with a camera;
  extracting trajectory data of the moving object in a pixel coordinate system from the captured video;
  for any target point in the trajectory data of the moving object, based on location information of the drone, attitude information of the camera, and intrinsic parameter information of the camera during capturing of each frame of the video, in combination with pixel coordinates of the target point in the pixel coordinate system, solving a representation of a unit direction vector corresponding to the target point in a camera coordinate system in an ECEF coordinate system, to obtain a representation of a vector from an ECEF origin to the target point; and
  representing coordinates of the target point in a WGS84 coordinate system by using the representation of the vector from the ECEF origin to the target point, and finally obtaining, through solving, the coordinates of the target point in the WGS84 coordinate system based on that an altitude of the target point is the same as an altitude at which the drone takes off.

A second aspect of the present invention provides a system for converting trajectory coordinates of a moving object.

The system for converting trajectory coordinates of moving objects, including:
  a drone with a camera, configured to capture a video of the moving object by using the camera;
  a moving object trajectory data extraction module, configured to: extract trajectory data of the moving object in a pixel coordinate system from the captured video;
  a coordinate conversion module, configured to: for any target point in the trajectory data of the moving object, based on location information of the drone, attitude information of the camera, and intrinsic parameter information of the camera during capturing of each frame of the video, in combination with pixel coordinates of the target point in the pixel coordinate system, solve a representation of a unit direction vector corresponding to the target point in a camera coordinate system in an ECEF coordinate system, to obtain a representation of a vector from an ECEF origin to the target point; and
  a coordinate solving module, configured to: represent coordinates of the target point in a WGS84 coordinate system by using the representation of the vector from the ECEF origin to the target point, and finally obtain, through solving, the coordinates of the target point in the WGS84 coordinate system based on that an altitude of the target point is the same as an altitude at which the drone takes off.

A third aspect of the present invention provides a non-transitory computer-readable storage medium, having a program stored therein, when the program is executed by a processor, implementing the steps of the method for converting trajectory coordinates of the moving object according to the first aspect of the present invention.

A fourth aspect of the present invention provides an electronic device, including a memory, a processor, and a program stored in the memory and capable of running on the processor, when the program is executed by the processor, implementing the steps of the method for converting trajectory coordinates of the moving object according to the first aspect of the present invention.

The foregoing one or more technical solutions have the following beneficial effect:

The present invention provides a method and a system for converting trajectory coordinates of moving objects. After a road traffic flow video captured by a drone is obtained, trajectory data of a vehicle in a pixel coordinate system is first extracted. Then coordinates of any target point in the trajectory data of the vehicle in the pixel coordinate system are transformed based on location information of the drone, attitude information of a camera, and intrinsic parameter information of the camera during capturing of each frame, to obtain, through solving, a representation, in an ECEF coordinate system, of a unit direction vector corresponding to the target point in a camera coordinate system, and further obtain a representation of a vector from an ECEF origin to the target point. In addition, a coordinate representation of the target point in a WGS84 coordinate system is obtained, and coordinates of the target point in the WGS84 coordinate system are obtained through solving. In the present invention, coordinates are converted without the need for calibration using control points. The present invention may be applied to video data processing of a camera in an urban road network in which it is difficult to implement camera calibration.

In the present invention, trajectory data of the vehicle in the WGS84 coordinate system is finally obtained after coordinates of any target point are transformed. This resolves a problem of extracting a trajectory of the moving object, such as a vehicle, based on a video.

Some of additional aspects and advantages of the present invention are provided in the following descriptions, and some become apparent in the following descriptions or are learned from practice of the present invention.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation on the present invention.

DETAILED DESCRIPTION OF THE INVENTION

It should be noted that the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention.

The embodiments in the present invention and features in the embodiments may be mutually combined in a case that no conflict occurs.

Embodiment 1

Figure 1:
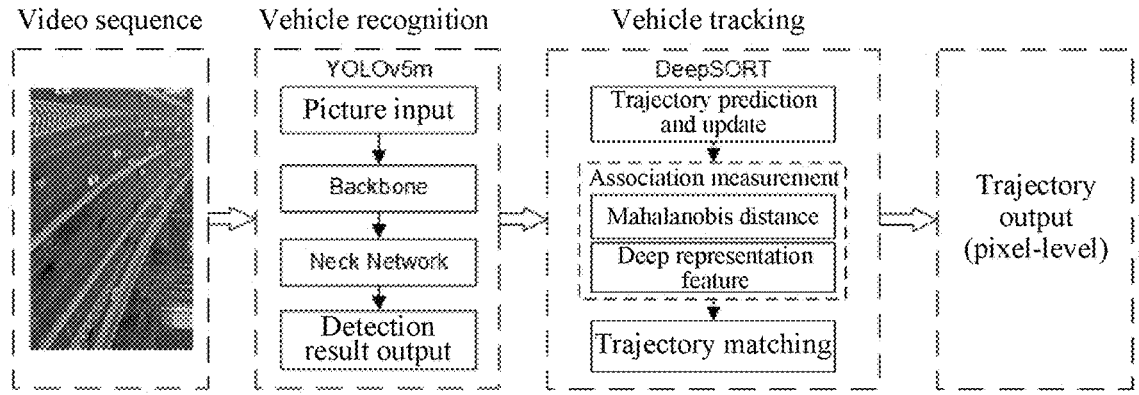
FIG. 1 is a schematic diagram of a process of extracting trajectory data of a vehicle according to a first embodiment.

As shown in FIG. 1, the present embodiment discloses a method for converting trajectory coordinates of moving objects. In the present embodiment, a video of a moving object that is captured by a drone is a road traffic flow video, and the moving object in the road traffic flow video is a vehicle.

The method for converting trajectory coordinates of moving objects in the present embodiment, including:
capturing a road traffic flow video by a drone with a camera;
extracting trajectory data of a vehicle in the road traffic flow in a pixel coordinate system from the captured road traffic flow video;
for any target point in the trajectory data of the vehicle, based on location information of the drone, attitude information of the camera, and intrinsic parameter information of the camera during capturing of each frame of the video, in combination with pixel coordinates of the target point in the pixel coordinate system, solving a representation of a unit direction vector corresponding to the target point in a camera coordinate system in an ECEF coordinate system, to obtain a representation of a vector from an ECEF origin to the target point; and
representing coordinates of the target point in a WGS84 coordinate system by using the representation of the vector from the ECEF origin to the target point, and finally obtaining, through solving, coordinates of the target point in the WGS84 coordinate system based on that an altitude of the target point is the same as an altitude at which the drone takes off.

The present embodiment provides a method for extracting a trajectory of a vehicle from a video captured and recorded by a drone, a fixed camera, or other devices. This resolves a problem of how to extract a (pixel-level) trajectory of a vehicle from a video and further convert trajectory data into trajectory data (latitude and longitude) in a geographic coordinate system. In general, in this application, a problem of extracting a trajectory of a moving object, such as a vehicle, based on a video is resolved.

The following describes the technical solution of the present embodiment in detail. The solution of the present embodiment is generally divided into two parts. In a first part, trajectory data of a vehicle is extracted by using two-stage object detection and tracking algorithm. In a second part, coordinates of a target point are transformed based on the extracted trajectory data of the vehicle.

(I) Object Detection Algorithm

In the present embodiment, a road traffic flow video is captured and recorded by using a drone, and vehicle traveling trajectory data in a road section is further extracted and analyzed by using a two-stage object detection and tracking algorithm. A general idea is to use a YOLOv5 algorithm to detect a vehicle object in a first stage, and use a DeepSORT multi-object tracking algorithm to track a trajectory of the vehicle object in a second stage.

A process of extracting trajectory data of the vehicle is shown in FIG. 1. Trajectory data of the vehicle in a pixel coordinate system is obtained based on the YOLOv5 and DeepSORT object detection and tracking algorithms. To further obtain data of the vehicle in a geographic coordinate system, an equation of conversion between coordinate systems is established for theoretical derivation.

Specifically, in the present embodiment, in the vehicle object detection stage, the YOLOv5 algorithm is selected to detect a vehicle target in a road section of an expressway, and YOLOv5m is selected as an internal network model. Since YOLO series algorithms were first proposed by Redmon, et al. in 2016, the YOLO series algorithms have gradually developed from YOLOv1 to YOLOv5, and have held a dominant position in the object detection field by virtue of excellent detection performance. The YOLOv5 was released on GitHub in open source mode in June 2020. YOLOv5 is fully implemented based on PyTorch, and is configured with four network models of different sizes: YOLOv5s, YOLOv5m, YOLOv5l, and YOLOv5x. The algorithm is briefly described as follows:

As shown in FIG. 1, after the road traffic flow video captured by the drone is obtained, each frame of image in the video is obtained, and the obtained image is input to the YOLOv5m network.

(1) Three operations are performed at an input end:
   O1: Mosaic data enhancement: A selected picture and three random pictures are randomly cropped and then spliced into one picture as training data to enrich background information of the picture;
   O2: Adaptive anchor box: An initial anchor box with a specified length and width is calculated, and a predicted box is output and is compared with a real box; and
   O3: Adaptive picture scaling: A size after scaling is calculated, a black edge padding value is calculated, and fewest black edges are adaptively added to an original image.

(2) At a backbone layer, the YOLOv5 includes two structures: one is: a focus structure for performing a slicing operation; and, another one is: a CSP structure.

(3) At a neck network layer, a network feature fusion capability is strengthened by using a CSP2_X structure designed with reference to CSPNet.

(4) Two operations are mainly performed at an output end:
   O1: Bounding box loss function: in the YOLOv5, CIoU loss is used as a bounding box loss function; and
   O2: Non-maximum suppression (NMS): if IoU in NMS is changed to DIoUNMS under the condition of same parameters; detection effect for some blocked or overlapping objects is improved to some extent.

Finally, a vehicle recognition and detection result is obtained.

In the vehicle object tracking stage, the classical Deep-SORT object tracking algorithm is selected. A new-trajectory confirmation step is introduced into the DeepSORT algorithm based on a SORT algorithm. A new trajectory has a confirmed state and an unconfirmed state. In addition, a Mahalanobis distance and a cosine similarity are used as a basis for distance measurement, and trajectory association is finally implemented through cascade matching. Specific steps of the algorithm are as follows:

step 1: obtaining a target candidate box based on a raw video frame by using an object detector, and then obtaining a detection result through filtering out excess boxes by using an NMS algorithm;

step 2: predicting a location and a state of an object in a next frame by using a recursive Kalman filter algorithm, then performing IoU matching between a predicted box and a detected box, and then selecting a box with higher confidence as a trajectory prediction result;

step 3: performing data association by using a linear weighting function that is based on a Mahalanobis distance of motion information and a cosine similarity of appearance features, and tracking trajectory matching is performed through cascade matching; and step 4: a result is output, tracker parameters are synchronously updated, and the algorithm process is repeated.

(II) Coordinate Conversion

Trajectory coordinates of the vehicle in the pixel coordinate system may be obtained by using the foregoing object detection and tracking algorithm. To obtain longitude and latitude coordinates of the vehicle in a WGS84 coordinate system, a conversion relationship between the pixel coordinate system and the WGS84 coordinate system needs to be explored based on intrinsic parameter information of a camera of the drone. In an entire object detection and tracking process, the drone, as an image shooting device, outputs a location as well as attitude and intrinsic parameter information of the camera for each frame. The information is stored in an SRT file of the drone.

Figure 2:
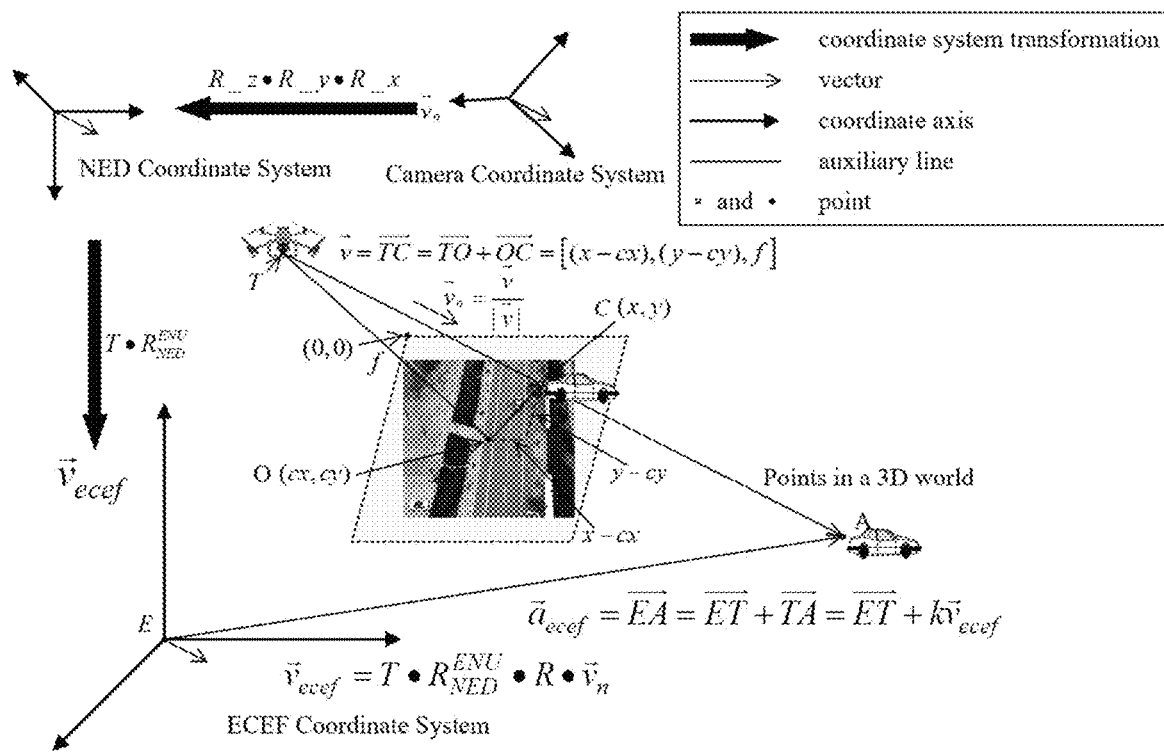
FIG. 2 is a diagram of a coordinate conversion relationship according to a first embodiment.

The longitude and latitude coordinates of the vehicle are derived based on the SRT file and the previously obtained pixel coordinates of the vehicle. A schematic diagram of a conversion relationship between coordinate systems is shown in FIG. 2, and related reference signs involved are defined in Table 1.

TABLE 1

Definitions of reference signs

| | Meaning | Reference sign | Unit |
|---|---|---|---|
| Location information of the drone | GPS latitude | Lat | radian |
| | GPS longitude | Lon | radian |
| | GPS altitude | alt | m |
| Attitude information of the camera | Pitch of a pan-tilt-zoom camera | Pitch | radian |
| | Roll of the pan-tilt-zoom camera | Roll | radian |
| | Yaw of the pan-tilt-zoom camera | yaw | radian |
| Intrinsic parameters of the camera | Main point | (cx, cy) | (pixel, pixel) |
| | Focal length | f | pixel |
| Pixel coordinate system | Pixel coordinates with an upper-left corner as an origin | (x, y) | (pixel, pixel) |

In FIG. 2, a point A in the 3D world represents a trajectory point of a target vehicle at any moment. In FIG. 2, a moving object is marked by a vehicle sign, and the point A is a location of the vehicle.

A direction vector corresponding to the target point A in a camera coordinate system may be obtained based on pixel coordinates of the vehicle and intrinsic parameter information of a camera as follows:

$$\vec{v} = [(x-cx),(y-cy),f] \qquad (1)$$

where, (cx, cy) is a main point in the intrinsic parameter information of the camera, f is a focal length in the intrinsic parameter information of the camera, and (x, y) is pixel coordinates of the target point in a pixel coordinate system.

A unit direction vector corresponding to the target point in the camera coordinate system is obtained through normalization:

$$\vec{v_n} = \frac{\vec{v}}{|\vec{v}|} \qquad (2)$$

A rotation matrix R from the camera coordinate system to a north-east-down (NED) coordinate system with the camera as an origin is as follows:

$$R = R\_z \cdot R\_y \cdot R\_x \qquad (3)$$

where, "·" indicates multiplication between matrices; R_z, R_y, and R_x are transformation matrices in a case in which the coordinate system rotates around a Z-axis, a Y-axis, and an X-axis respectively, and may be expressed by using a pitch, a yaw, and a roll as follows:

$$R\_z = \begin{bmatrix} \cos(yaw) & -\sin(yaw) & 0 \\ \sin(yaw) & \cos(yaw) & 0 \\ 0 & 0 & 1 \end{bmatrix}, \qquad (4)$$

$$R\_y = \begin{bmatrix} \cos(pitch) & 0 & \sin(pitch) \\ 0 & 1 & 0 \\ -\sin(pitch) & 0 & \cos(pitch) \end{bmatrix},$$

$$R\_x = \begin{bmatrix} 1 & 0 & 0 \\ 0 & \cos(roll) & -\sin(roll) \\ 0 & \sin(roll) & \cos(roll) \end{bmatrix}.$$

A rotation matrix $R_{NED}^{ENU}$ from the north-east-down coordinate system to an east-north-up (ENU) coordinate system is as follows:

$$R_{NED}^{ENU} = \begin{bmatrix} 0 & 1 & 0 \\ 1 & 0 & 0 \\ 0 & 0 & 1 \end{bmatrix} \quad (5)$$

A rotation matrix T from the east-north-up coordinate system to an ECEF coordinate system is as follows:

$$T = \begin{bmatrix} -\sin(\text{lon}) & -\sin(\text{lat})\cos(\text{lon}) & \cos(\text{lat})\cos(\text{lon}) \\ \cos(\text{lon}) & -\sin(\text{lat})\sin(\text{lon}) & \cos(\text{lat})\sin(\text{lon}) \\ 0 & \cos(\text{lat}) & \sin(\text{lat}) \end{bmatrix} \quad (6)$$

where, lon and lat indicate a longitude and a latitude in location information of a drone respectively, and alt indicates an altitude in the location information of the drone.

Therefore, the unit direction vector corresponding to the point A in the camera coordinate system is expressed as $\vec{v}_{ecef}$ in the ECEF coordinate system:

$$\vec{v}_{ecef} = T \cdot R_{NED}^{EDU} \cdot \vec{v}_n = (x_v, y_v, z_v) \quad (7)$$

A vector from an ECEF origin to the camera may be expressed in the ECEF coordinate system by using longitude, latitude, and altitude as follows:

$$c_{ecef} = \text{transform}_{wgs84}^{ECEF}(\text{lon}, \text{lat}, \text{alt}) = (x_c, y_c, z_c) \quad (8)$$

where, $\text{transform}_{wgs84}^{ECEF}$ indicates conversion from coordinates in a WGS84 coordinate system to corresponding coordinates in the ECEF coordinate system, and $(x_c, y_c, z_c)$ is a representation of the vector from the ECEF origin to the camera in the ECEF coordinate system.

Therefore, a vector from the ECEF origin to the point A may be expressed as follows:

$$\vec{a}_{ecef} = \vec{c}_{ecef} + k\vec{v}_{ecef} = (x_c + kx_v, y_c + ky_v, z_c + kz_v) \quad (9)$$

where, k indicates modulus of a vector from an origin of the camera coordinate system to the target point A.

It is assumed that coordinates of the target point A in the WGS84 coordinate system are expressed as $(\text{lon}_a, \text{lat}_a, \text{alt}_a)$. Because an altitude of the target point A is the same as an altitude at which the drone takes off, the coordinates of the target point A in the WGS84 coordinate system may be expressed by using a formula (10):

$$\begin{cases} \text{lon}_a, \text{lat}_a, \text{alt}_a = \text{transform}_{ECEF}^{wgs84} \vec{a}_{ecef} \\ \text{alt}_a - (\text{alt} - \text{ralt}) = 0 \end{cases} \quad (10)$$

where, $\text{transform}_{ECEF}^{wgs84}$ indicates conversion from ECEF coordinates to the WGS84 coordinate system, r is short for relative and indicates a relative altitude, and ralt indicates an altitude of the drone relative to the target vehicle after the drone takes off.

A value of k is obtained through solving by combining the formulas (9) and (10). Then the value of k may be substituted into the formula (9) to obtain WGS84 coordinates of the target point A, as shown in a formula (11):

$$\text{lon}_a, \text{lat}_a, \text{alt}_a = \text{transform}_{ECEF}^{wgs84}(x_c + kx_v, y_c + ky_v, z_c + kz_v) \quad (11)$$

Because the drone and the target vehicle are on a same ground plane before the drone takes off, the altitude of the target point A is the same as the altitude at which the drone takes off.

Embodiment 2

The present embodiment discloses a system for converting trajectory coordinates of moving objects.

The system for converting trajectory coordinates of moving objects, including:
- a drone with a camera, configured to capture a video of a moving object by using the camera;
- a moving object trajectory data extraction module, configured to: extract trajectory data of the moving object in a pixel coordinate system from the captured video;
- a coordinate conversion module, configured to: for any target point in the trajectory data of the moving object, based on location information of the drone, attitude information of the camera, and intrinsic parameter information of the camera during capturing of each frame of the video, in combination with pixel coordinates of the target point in the pixel coordinate system, solve a representation of a unit direction vector corresponding to the target point in a camera coordinate system in an ECEF coordinate system, to obtain a representation of a vector from an ECEF origin to the target point; and
- a coordinate solving module, configured to: represent coordinates of the target point in a WGS84 coordinate system by using the representation of the vector from the ECEF origin to the target point, and finally obtain, through solving, coordinates of the target point in the WGS84 coordinate system based on that an altitude of the target point is the same as an altitude at which the drone takes off.

Embodiment 3

An objective of the present embodiment is to provide a non-transitory computer-readable storage medium.

The computer-readable storage medium has a computer program stored therein. When the program is executed by a processor, implementing the steps of the method for converting trajectory coordinates of the moving object according to Embodiment 1 of the present invention.

Embodiment 4

An objective of the present embodiment is to provide an electronic device.

The electronic device includes a memory, a processor, and a program stored in the memory and capable of running on the processor. When the program is executed by the processor, implementing the steps of the method for converting trajectory coordinates of the moving object according to Embodiment 1 of the present invention.

Steps related to the apparatuses in Embodiments 2 to 4 corresponds to Embodiment 1 of the method. For specific implementations, refer to related descriptions in Embodiment 1. The term "non-transitory computer-readable storage medium" should be understood as a single medium or a plurality of media including one or more instruction sets, and should be further understood as including any medium, where the any medium is capable of storing, encoding, or carrying an instruction set that is to be executed by a processor and that enables the processor to perform any one of the methods in the present invention.

A person skilled in the art should understand that the modules or the steps in the present invention may be implemented by a general-purpose computer apparatus, or optionally, may be implemented by program code that can be executed by a computing apparatus. Therefore, the modules or the steps may be stored in a storage apparatus and executed by a computing apparatus, or the modules or the steps are respectively made into integrated circuit modules, or a plurality of the modules or the steps are made into a single integrated circuit module for implementation. The present invention is not limited to any particular combination of hardware and software.

Specific implementations of the present invention are described above with reference to the accompanying drawings, but are not intended to limit the protection scope of the present invention. A person skilled in the art should understand that various modifications or variations may be made without creative efforts based on the technical solutions of the present invention, and such modifications or variations shall fall within the protection scope of the present invention.

The invention claimed is:

1. A method for converting trajectory coordinates of moving objects, comprising:
  obtaining a video of a moving object captured by a drone, and extracting trajectory data of the moving object in a pixel coordinate system from the captured video; wherein, extracting and analyzing the trajectory data by using a two-stage object detection and tracking algorithm;
  for any target point in the trajectory data of the moving object, based on location information of the drone, attitude information of the camera, and intrinsic parameter information of the camera during capturing of each frame of the video, in combination with pixel coordinates of the target point in the pixel coordinate system, solving a representation of a unit direction vector corresponding to the target point in a camera coordinate system in an ECEF coordinate system, to obtain a representation of a vector from an ECEF origin to the target point, wherein a unit direction vector corresponding to a point A in the camera coordinate system is expressed as $\vec{v}_{ecef}$ in the ECEF coordinate system, and is specifically as follows:

$\vec{v}_{ecef} = T \cdot R_{NED}^{ENU} \cdot R \cdot \vec{v}_n = (x_v, y_v, z_v)$, wherein $R = R\_z \cdot R\_y \cdot R\_x$, $R_{NED}^{ENU} = \begin{bmatrix} 0 & 1 & 0 \\ 1 & 0 & 0 \\ 0 & 0 & 1 \end{bmatrix}$, and $T = \begin{bmatrix} -\sin(lon) & -\sin(lat)\cos(lon) & \cos(lat)\cos(lon) \\ \cos(lon) & -\sin(lat)\sin(lon) & \cos(lat)\sin(lon) \\ 0 & \cos(lat) & \sin(lat) \end{bmatrix}$, where, R is a rotation matrix from the camera coordinate system to a north-east-down coordinate system with the camera as an origin, $R_{NED}^{ENU}$ is a rotation matrix from the north-east-down coordinate system to an east-north-up coordinate system, T is a rotation matrix from the east-north-up coordinate system to the ECEF coordinate system, and $\vec{v}$ is the unit direction vector corresponding to the target point in the camera coordinate system;

R_z, R_y, and R_x are transformation matrices in a case in which the coordinate system rotates around a Z-axis, a Y-axis, and an X-axis respectively; and, lon and lat indicate a longitude and a latitude in location information of a drone respectively;

a vector from an ECEF origin to the camera is expressed in the ECEF coordinate system by using longitude, latitude, and altitude as follows:

$\vec{c}_{ecef} = \text{transform}_{wgs84}^{ECEF}(lon, lat, alt) = (x_c, y_c, z_c)$, where, $\text{transform}_{wgs84}^{ECEF}$ indicates conversion from coordinates in a WGS84 coordinate system to corresponding coordinates in the ECEF coordinate system, and $(x_c, y_c, z_c)$ is a representation of the vector from the ECEF origin to the camera in the ECEF coordinate system; and, alt indicates an altitude in the location information of the drone; and a vector from the ECEF origin to the point A is expressed as follows:

$\vec{a}_{ecef} = \vec{c}_{ecef} + k\vec{v}_{ecef} = (x_c + kx_v, y_c + ky_v, z_c + kz_v)$, where, k indicates modulus of a vector from an origin of the camera coordinate system to the target point A; and
  representing coordinates of the target point in the WGS84 coordinate system by using the representation of the vector from the ECEF origin to the target point, and finally obtaining, through solving, the coordinates of the target point in the WGS84 coordinate system based on that an altitude of the target point is the same as an altitude at which the drone takes off.

2. The method for converting trajectory coordinates of moving objects according to claim 1,
  wherein the solving the representation of the unit direction vector corresponding to the target point in the camera coordinate system in the ECEF coordinate system, specifically comprising:
  obtaining the unit direction vector corresponding to the target point in the camera coordinate system based on the pixel coordinates of the target point in the pixel coordinate system and the intrinsic parameter information of the camera;
  obtaining the rotation matrix R from the camera coordinate system to the north-east-down coordinate system with the camera as the origin based on the attitude information of the camera, determining the rotation matrix $R_{NED}^{ENU}$ from the north-east-down coordinate system to the east-north-up coordinate system, and obtaining the rotation matrix T from the east-north-up coordinate system to the ECEF coordinate system based on the location information of the drone; and
  obtaining the representation, in the ECEF coordinate system, of the unit direction vector corresponding to the target point in the camera coordinate system based on the rotation matrix R, the rotation matrix $R_{NED}^{ENU}$, and the rotation matrix T, in combination with the unit direction vector corresponding to the target point in the camera coordinate system.

3. The method for converting trajectory coordinates of moving objects according to claim 2, wherein the unit direction vector $\vec{v}_n$ corresponding to the target point in the camera coordinate system is expressed as follows:

$$\vec{v_n} = \frac{\vec{v}}{|\vec{v}|};$$

and $$\vec{v} = [(x-cx), (y-cy), f],$$

where, (cx, cy) is a main point in the intrinsic parameter information of the camera, f is a focal length in the intrinsic parameter information of the camera, (x, y) is pixel coordinates of the target point in a pixel coordinate system, and $\vec{v}$ is a direction vector of the target point in the camera coordinate system.

4. The method for converting trajectory coordinates of moving objects according to claim 1, wherein assuming that the coordinates of the target point in the WGS84 coordinate system are expressed as $(lon_a, lat_a, alt_a)$, then:

$$\begin{cases} lon_a, lat_a, alt_a = \text{transform}_{ECEF}^{wgs84} \overrightarrow{a_{ecef}} \\ alt_a - (alt - ralt) = 0 \end{cases},$$

where, $\text{transform}_{ECEF}^{wgs84}$ indicates conversion from ECEF coordinates to the WGS84 coordinate system; and WGS84 coordinates of the target point are obtained after a value of k is obtained through solving, and ralt indicates an altitude of the drone relative to a target vehicle after the drone takes off.

5. The method for converting trajectory coordinates of moving objects according to claim 1, wherein the trajectory data of the moving object is extracted based on the two-stage object detection and tracking algorithm:
   in a first stage, the moving object is detected by using a YOLOv5 algorithm; and
   in a second stage, a trajectory of the moving object is tracked by using a DeepSORT multi-object tracking algorithm.

6. A system for converting trajectory coordinates of moving objects, comprising:
   a moving object trajectory data extraction module, configured to: obtain a video of a moving object captured by a drone, extract trajectory data of the moving object in a pixel coordinate system from the captured video; wherein, extracting and analyzing the trajectory data by using a two-stage object detection and tracking algorithm;
   a coordinate conversion module, configured to: for any target point in the trajectory data of the moving object, based on location information of the drone, attitude information of the camera, and intrinsic parameter information of the camera during capturing of each frame of the video, in combination with pixel coordinates of the target point in the pixel coordinate system, solve a representation of a unit direction vector corresponding to the target point in a camera coordinate system in an ECEF coordinate system, to obtain a representation of a vector from an ECEF origin to the target point, wherein a unit direction vector corresponding to a point A in the camera coordinate system is expressed as $\vec{v}_{ecef}$ in the ECEF coordinate system, and is specifically as follows:

$$\vec{v}_{ecef} = T \cdot R_{NED}^{ENU} \cdot R \cdot \vec{v}_n = (x_v, y_v, z_v), \text{ wherein}$$

$$R = R\_z \cdot R\_y \cdot R\_x,$$

$$R_{NED}^{ENU} = \begin{bmatrix} 0 & 1 & 0 \\ 1 & 0 & 0 \\ 0 & 0 & 1 \end{bmatrix},$$

and $$T = \begin{bmatrix} -\sin(lon) & -\sin(lat)\cos(lon) & \cos(lat)\cos(lon) \\ \cos(lon) & -\sin(lat)\sin(lon) & \cos(lat)\sin(lon) \\ 0 & \cos(lat) & \sin(lat) \end{bmatrix},$$

where, R is a rotation matrix from the camera coordinate system to a north-east-down coordinate system with the camera as an origin, $R_{NED}^{ENU}$ is a rotation matrix from the north-east-down coordinate system to an east-north-up coordinate system, T is a rotation matrix from the east-north-up coordinate system to the ECEF coordinate system, and $\vec{v}$ is the unit direction vector corresponding to the target point in the camera coordinate system;

R_z, R_y, and R_x are transformation matrices in a case in which the coordinate system rotates around a Z-axis, a Y-axis, and an X-axis respectively; and, lon and lat indicate a longitude and a latitude in location information of a drone respectively;

a vector from an ECEF origin to the camera is expressed in the ECEF coordinate system by using longitude, latitude, and altitude as follows:

$$\vec{c}_{ecef} = \text{transform}_{wgs84}^{ECEF}(lon, lat, alt) = (x_c, y_c, z_c),$$

where, $\text{transform}_{wgs84}^{ECEF}$ indicates conversion from coordinates in a WGS84 coordinate system to corresponding coordinates in the ECEF coordinate system, and $(x_c, y_c, z_c)$ is a representation of the vector from the ECEF origin to the camera in the ECEF coordinate system; and, alt indicates an altitude in the location information of the drone; and a vector from the ECEF origin to the point A is expressed as follows:

$$\vec{a}_{ecef} = \vec{c}_{ecef} + k\vec{v}_{ecef} = (x_c + kx_v, y_c + ky_v, z_c + kz_v),$$

where, k indicates modulus of a vector from an origin of the camera coordinate system to the target point A; and representing coordinates of the target point in the WGS84 coordinate system by using the representation of the vector from the ECEF origin to the target point, and finally obtaining, through solving, the coordinates of the target point in the WGS84 coordinate system based on that an altitude of the target point is the same as an altitude at which the drone takes off.

7. A non-transitory computer-readable storage medium, having a program stored therein, wherein, when the program is executed by a processor, implementing steps of the method for converting trajectory coordinates of moving objects according to claim 1.

8. An electronic device, comprising a memory, a processor, and a program stored in the memory and capable of running on the processor, wherein, when the program is executed by the processor, implementing steps of the method for converting trajectory coordinates of moving objects according to claim 1.

* * * * *